United States Patent
Zechnall et al.

[15] 3,642,329
[45] Feb. 15, 1972

[54] WHEEL SLIP DETECTION DEVICE PARTICULARLY FOR MULTIWHEEL VEHICLES

[72] Inventors: Richard Zechnall, Stuttgart; Helmut Domann, Leonberg; Helmut Fleischer; Klaus Christ, both of Stuttgart; Wolfgang Maisch, Schwieberdingen, all of Germany

[73] Assignee: Robert Bosch GmbH, Stuttgart, Germany

[22] Filed: Apr. 20, 1970

[21] Appl. No.: 29,825

[30] Foreign Application Priority Data

Apr. 19, 1969 Germany ..................... P 19 19 929.2

[52] U.S. Cl. ..................... 303/21 BE, 188/181 A, 303/20
[51] Int. Cl. ..................... B60t 8/12
[58] Field of Search ................. 188/181; 303/20, 21; 317/5; 324/161–162, 181; 340/263, 262

[56] References Cited

UNITED STATES PATENTS

| 3,245,727 | 4/1966 | Anderson et al. | 303/21 EB |
| 3,500,190 | 3/1970 | Michon | 324/161 |
| 3,494,671 | 2/1970 | Slavin et al. | 303/21 P |
| 3,184,606 | 5/1965 | Ovenden et al. | 303/21 CE UX |
| 3,469,662 | 9/1969 | Dewar | 303/21 CG |
| 3,146,432 | 8/1964 | Johnson | 324/161 X |
| 3,234,447 | 2/1966 | Sauber | 324/161 X |

Primary Examiner—Milton Buchler
Assistant Examiner—Stephen G. Kunin
Attorney—Flynn & Frishauf

[57] ABSTRACT

To detect transition from rolling to slipping of a wheel over a surface, a transducer coupled to the wheel provides output pulses having a repetition rate representative of wheel speed. The pulses are applied to a logic circuit, including a pair of multivibrators, one of which has a variable time circuit, controlling its unstable state in dependence on pulse repetition rate. Control of the unstable state is obtained by means of a band-pass filter coupled to an integrator, the output of the band-pass filter further controlling a comparison and coincidence network, the output from the network activating a wheel slip detector and, if desired, overriding control of braking.

15 Claims, 7 Drawing Figures

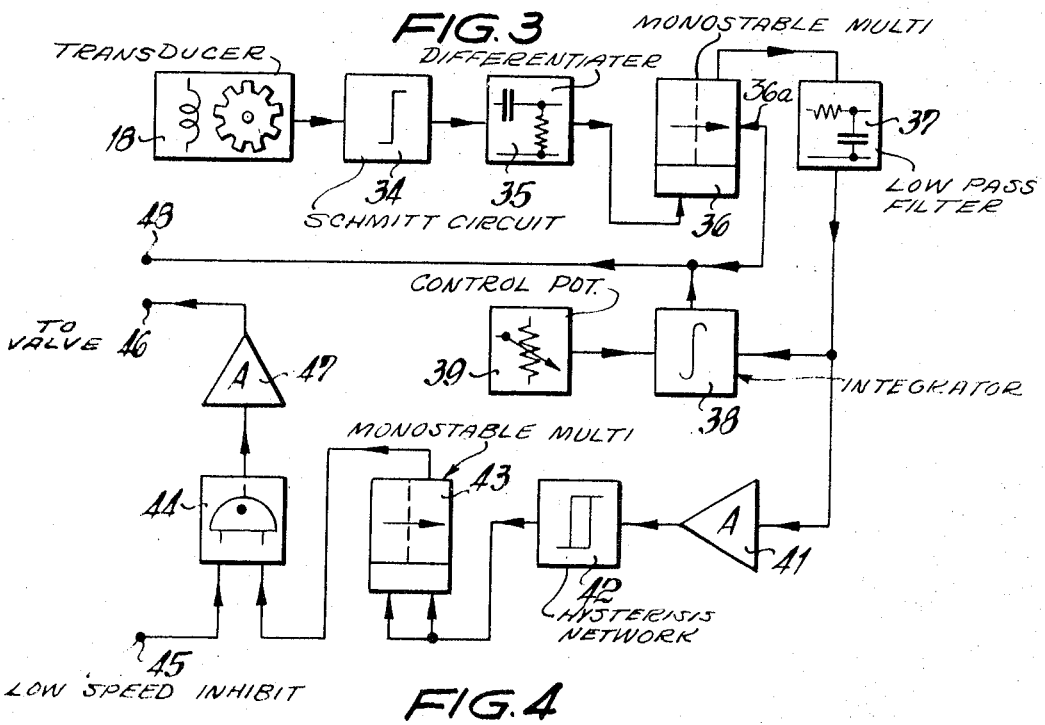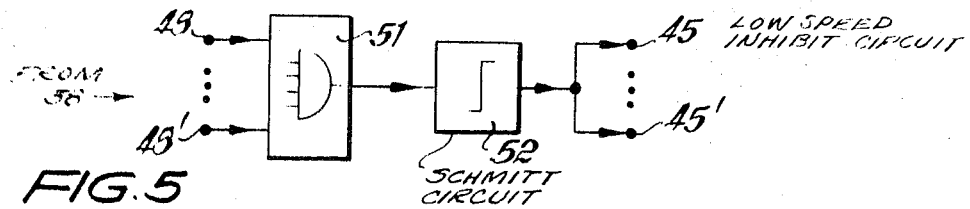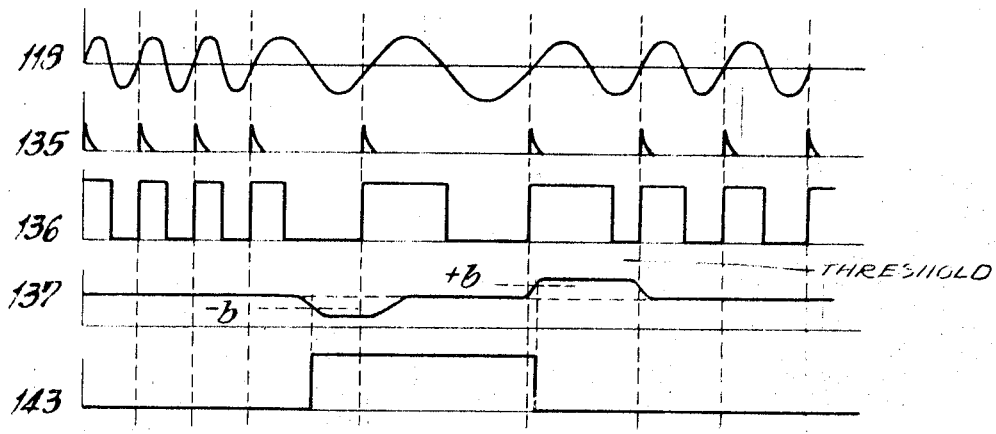

WHEEL SLIP DETECTION DEVICE PARTICULARLY FOR MULTIWHEEL VEHICLES

The present invention relates to a system to detect transition between rolling and slipping of wheels over a surface, for example when a wheel is rapidly accelerated, or sharply braked, and more particularly to such a system intended for association with braking, or acceleration control systems to prevent slipping of the wheel, and thus skidding, or loss of tractive effort, essentially without delay.

In the prior application, U.S. Ser. No. 879,044, of Nov. 24, 1969 and assigned to the assignee of the present application, a wheel slip detection device has been disclosed which utilizes electronic circuitry to detect the rate of change of speed of any one wheel of a vehicle, and causes corrective action to be undertaken if this rate exceeds a predetermined value. The basic system, and the requirements for such a system are fully explained in the copending application, as well as in copending application U.S. Ser. No. 879,287 of Nov. 24, 1969, likewise assigned to the assignee of the present application, and the disclosures of these applications are hereby incorporated by reference.

It is an object of the present invention to improve upon the slip detection systems of the above-referred-to applications, to make the systems respond faster, and to eliminate spurious responses particularly during low vehicle speeds upon braking.

SUBJECT MATTER OF THE PRESENT INVENTION

Briefly, the wheels, or their shafts of the vehicle are provided with pulse sources, such as a rotating magnet without mechanical contact, and cooperating with a fixed element, such as a coil, to provide an output signal which has a characteristic representative of wheel speed, such as a sine wave or pulse sequence. The signal is transformed into pulses having a pulse repetition rate representative of wheel speed. The pulses are analyzed in a logic network which senses elapsed time between the pulses. When the elapsed time between pulses deviates from a predetermined value, that is when the change of pulse rate exceeds a predetermined limit, an output signal is derived which can be used to control a braking, or accelerating system to decrease the power (braking or acceleration) transfer to the wheel, and thus prevent wheel slip. The system in accordance with the present invention includes a band-pass filter, such as a low-pass filter. Each one, or a selected group of wheels of the vehicle may have a pulse source associated therewith. A common control is then provided to override power transfer to any one, or group of wheels, the common control being responsive to absolute wheel speed.

The invention will be described by way of example with reference to the accompanying drawings, wherein:

FIG. 3 is a schematic block circuit diagram of a portion of the system of FIG. 1;

FIG. 4 is a schematic block diagram of a low-speed inhibit circuit;

FIG. 5 is a series of timing diagrams illustrating voltage relationships in the circuits of FIGS. 3 and 4 upon deceleration;

Figure 1:
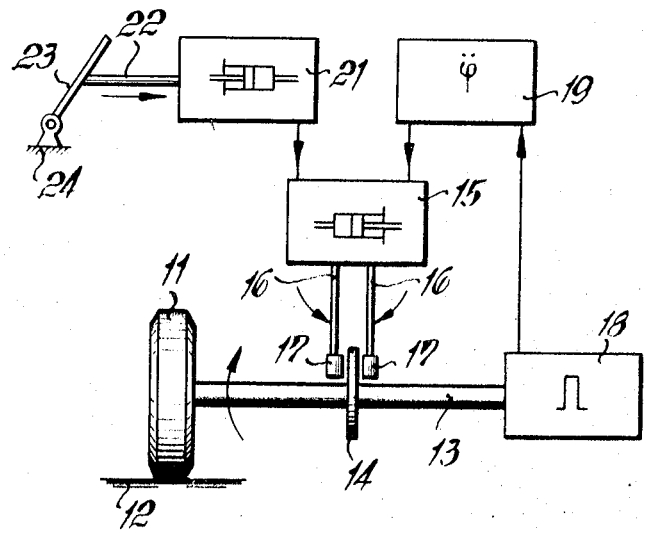
FIG. 1 is a schematic arrangement of the slip detection device for braking of wheels.

A wheel 11 rolls over a way surface 12. Wheel 11 is coupled to a shaft 13 having a brake disk 14, subject to braking effort by a pair of brake shoes 17, 17 activated over links 16, 16 from a brake cylinder 15. The action of brake cylinder 15, itself, is controlled from a brake pedal 23 secured to a fixed part of the vehicle, schematically indicated at 24, and acting over a linkage 22. Depression of brake pedal 23 by an operator causes braking of the vehicle. The brake pedal pressure, transmitted over linkage 22, controls a master cylinder 21 which, in turn, controls brake cylinder 15 to activate brake shoes 17.

A pulse source 18 is connected to shaft 13 to rotate therewith. The output of pulse source 18 is connected to a logic circuit 19 which has an output controlling the braking effort of braking cylinder 15 to be transmitted to brake shoes 17.

If the operator depresses brake pedal 23 in an excessive amount, so that the braking effort transmitted to wheel 11 will be excessive, wheel 11 will lock and, instead of rolling, will slip. During rotation of the wheel, pulse generator 18 will supply a signal having a characteristic representative of wheel speed, for example supply an undulating wave, or pulses, having a frequency, or pulse repetition rate, respectively, dependent on the circumferential speed of wheel 11.

Figure 2:
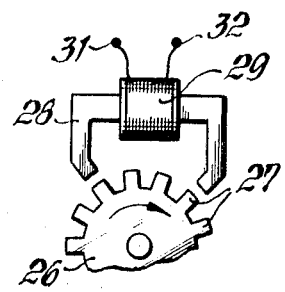
FIG. 2 is a schematic representation of a suitable transducer.

FIG. 2 illustrates the pulse generator: a toothed wheel 26, having salient poles 27 of ferromagnetic material is coupled mechanically to the wheel shaft 13. A horseshoe-shaped yoke 28 spans a portion of the circumference of wheel 26, such that pole shoes extending from the yoke 28 either match projecting teeth 27, or the gaps between the teeth. A magnetizing current applied through coil 29 will then undulated since the inductivity of coil 29 will depend on the position of wheel 26 with respect to the yoke 28, that is whether the reluctance of the path is low (teeth 27 matching the yoke) or high (gaps between the teeth opposite the yoke). Upon rotation of wheel 26 beneath yoke 28, the inductivity of the coil will vary and an alternating current will be induced. The alternating current component is derived at terminal 31, 32 of coil 29.

Different forms of the transducer suggest themselves: for example, the wheel 26 may have a plurality of magnets 27 applied to salient poles thereof, the magnets being of opposite polarity. These magnets can be applied as separate elements, made of a suitable magnetic material, on a suitable wheel; alternatively, the wheel, with the teeth, may be made of material of high retentivity, and the teeth subsequently magnetized. The yoke will then be so arranged that one leg thereof matches the magnet of one polarity, and the other that of the opposite polarity. Upon rotation of wheel 26, an alternating wave will be obtained from the transducer.

Other suitable tachometer generators may be used, as well as optical arrangements, as disclosed in detail in the aforementioned applications, the disclosure of which is hereby incorporated by reference.

The distance between pulses, or undulations derived from the tachometer generator (or equivalent transducer) is processed in circuit 19. If the rate of change between pulses obtained from pulse generator 18 departs from a predetermined value, then circuit 19 will provide a signal which controls the power transfer to the wheels 11. In FIG. 1, brake cylinder 15 will be controlled to reduce the braking effort applied by brake shoe 17 to disk 14. As the absolute speed of the vehicle decreases, the distance between pulses, or undulations derived from transducer 18 increases. The circuit of the present invention recognizes not only the variation in the rate of change of the pulses, but absolute distance between pulses itself, so that override of braking effort controlled, for example, by the operator over pedal 23 will depend on the absolute instantaneous speed of the vehicle itself.

Referring now to FIG. 3: a transducer 18 (FIG. 2) which may have an amplifier connected thereto, has its output connected to the input of a Schmitt trigger 34, the output of which is connected to the input of a differentiating network 35. The output of differentiating network 35 is connected to the input of an input-monostable multivibrator circuit 36. Monostable multivibrator 36 has a variable time of instability, controlled by application of a potential to a control input 36a.

The output of monostable multivibrator 36 is connected to the input of a low-pass filter 37, the output of which is connected to the input of an integrating network 38. Integrating network 38 additionally has a control potential applied thereto, as schematically indicated by circuit 39, for example applying a potential from the tap point of a potentiometer. The output of the integrator 38 is connected to the control input 36a of input monostable multivibrator 36.

The output of low-pass filter 37 is not only connected to the integrator 38, but additionally, over an amplifier 41, to a hysteresis network 42. Hysteresis network 42 which may be considered to act as a two-point (±) comparator, may include an operational amplifier, a Schmitt trigger, or the like. Hysteresis network 42 has its output connected with both inputs of an output-monostable multivibrator 43. The output of monostable multivibrator 43 is connected to a first input of a coincidence circuit 44, functioning as a AND gate. The second input of the coincidence gate 44 is connected to a terminal 45, which may be termed a "low-speed inhibit terminal" (see also FIG. 4). The output of coincidence gate 44 is connected to an amplifier 47 and then to output 46 which can be connected to a bypass valve, an electrical valve, or other similar control to relieve braking pressure from cylinder 15 to brake shoes 17, in other words to override transfer of braking power from pedal 23 to the brake shoe 17.

The low-speed inhibit circuit is illustrated in FIG. 4. Inputs 48, one each connected to the output of integrator 38 (FIG. 3) and connected to a respective circuit associated with a respective transducer 18 of a wheel to be controlled is connected to an AND-gate 51, having as many inputs as transducers 18 are present on the vehicle, connected to respective wheels. AND-gate 51 is connected to an amplifier 52, for example again a Schmitt trigger, having a plurality of outputs 45—45', each one connected to a respective low-speed inhibit input terminal 45 of the override control for any one single, or group of wheels to be controlled.

OPERATION

The signal obtained from transducer 18, amplified, is illustrated at graph 118 in FIG. 5, having undulations the distance of which is inversely proportional to the speed of wheel 11. The signal 118 is converted by Schmitt trigger 34 into square waves, and differentiated in differentiator network 35 to form a series of needle pulses 135. Needle pulses 135, upon occurrence, trigger monostable multivibrator 36 into unstable state, so that the output thereof will be a signal 136 (FIG. 5). The duration of these pulses is controlled, as will be explained below. The output pulses from multivibrator 36 are passed through low-pass filter 37, to provide an output voltage which is substantially constant and representative of the time average. For a vehicle running at an even speed, the times variation of the output voltage of multivibrator 36, and thus of low-pass filter 37 will be the even voltage at the left side of graph 137. The average value 137 is applied to the input of integrator 38. The other input to integrator 38 is a control potential which is constant and can be set to a desired value. Integrator 38 is connected to control input terminal 36a of the input monostable multivibrator 36 and controls the unstable period of the element 36 in such a manner, that the on-off periods, that is the "mark" to "space" is essentially constant, as seen at the left four pulses at graph 136. The average value of voltage 137, that is the time average of the pulses 136 is independent of speed of the wheel 11, so long as the rate of change of wheel speed 11 is zero (even speed). If, however, the frequency of the wave derived from transducer 18 changes, then integrator 38 will lag behind control of the mark-space ratio of multivibrator 36, and the time average value of voltage 137 will vary from the output voltage obtained when the speed is uniform. The variation will increase with increasing rate of change of speed. Upon excessive acceleration, therefore, the output voltage 137 at the low-pass filter 137 will initially decrease.

The output voltage 137, derived from low-pass filter 37 is additionally applied to amplifier 41, and, after amplification, applied to hysteresis unit 42. If the voltage obtained from amplifier 41 drops below a predetermined value (minus b—FIG. 5) then a pulse will be transmitted to output multivibrator 43 to provide an output pulse of, for example, 200 milliseconds. This pulse will be obtained when wheel 11 is decelerated by an amount which is greater than the permitted value (minus b). The output pulse 143, illustrated in FIG. 5, is applied over coincidence gate 44 (terminal 45 being assumed active) and amplifier 47 to terminal 46, to control a magnetic valve, or the like, to decrease the braking pressure of cylinder 15, acting on wheel 11. Wheel 11, which may have begun to slip, will be braked less.

If the wheel speed does not continue to change, then the average value 137 of the output pulses 136 of the input multivibrator will remain constant, and the output pulse from output multivibrator 43 will continue. As the wheel accelerates, however, due to a decreased braking effort, the output voltage 137 derived from low pass filter 37 will increase, so that the upper threshold of hysteresis circuit 42 will be exceeded (plus b—FIG. 5). This causes the output multivibrator 43 to be turned off, and to revert to stable state—see FIG. 5. The magnetic valve, previously controlled over coincidence gate 44 and amplifier 47 is now no longer activated, and, if the operator continues to exert braking effort, braking pressure will again increase. The output multivibrator will be ready to be triggered again into unstable state by the hysteresis circuit 42, for example after the brief period of 100 milliseconds.

If wheel 11, in spite of decreased braking efforts from brakes 14, 17, is still slipping and not sufficiently accelerated, as may occur upon extremely slippery conditions, for example ice, then the distance between pulses from the input monostable multivibrator 36 (graph 136—FIG. 5) does not decrease, and the output voltage 137 of low-pass filter 37 does not increase sufficiently. As a result, the upper threshold value of hysteresis circuit 42 (plus b) is not reached. However, the unstable period of output multivibrator 43 is predetermined, for example 200 milliseconds, and braking effort is again transmitted, at least for a short recovery period. This provides for intermittent braking.

If the instantaneous speed of the vehicle is low, then the distance between pulses 135 will be great, and input monostable multivibrator 36 is triggered only with substantial time gaps. This causes the output voltage of low-pass filter 37 to become undulating. Due to this undulation, the lower threshold value −b, and the upper threshold value +b of hysteresis element 52 can be exceeded even if the vehicle speed is uniform, but low, causing constant changeover of the output monostable multivibrator and thus operation of the override control valve (not shown in the drawings). To avoid this unnecessary mechanical action, the circuit of FIG. 4 is provided, which may be termed a low speed inhibit circuit.

Inputs 48—48' to the AND-gate 51 represent voltages which depend on the speed of the individual wheels 11 of a multiwheel vehicle. Each individual wheel, or group of wheels (for example in a tandem driven tractor) is supplied with an associated transducer 18. The speed-dependent voltage can be obtained easily from the integrator 38, at terminal 48. If all of the wheels (or groups of wheels) having transducers associated therewith are at speeds which are below a predetermined minimum limit, for example about 7 km./hour (below 5 m.p.h.), then the logic of AND-gate 51 is met and Schmitt trigger 52 changes state, blocking application of an output potential at terminals 45—45' to inhibit bypass of braking effort by possible energization of terminal 46. The circuit of FIG. 4 need be present in a vehicle only once, whereas transducer 18, and brake control network 19 is present for a wheel, or group of wheels. The output voltage of circuit 52 is applied over terminals 45—45' to each one of the gates 44 of the respective circuit 19. When AND-gate 51 is energized, then the condition for operation of coincidence 44 is no longer met and circuit 19 cannot override braking effort applied by the operator to brake pedal 23, and a bypass valve (not shown) cannot decrease effort from cylinder 15.

The control time constants of circuit 19 are preferably selected to be comparatively large, so that minute changes in speed, for example caused by unevenness in the running surface, road bumps, and the like, will not cause operation of the valve overriding cylinder 15. Thus, flutter of magnetic valves in the brake cylinders 15 is avoided.

The system of the present invention has the advantage that it can operate with transducers without mechanical contacts, thus providing for reliable operation over the lifetime of the vehicle. The system itself can be so adjusted to operate practically without any noticeable delay, so that override of braking, or acceleration control can be obtained immediately, as soon as a wheel just begins to slip, and before all rolling friction has been lost. By measuring the wheel speed digitally, the system is particularly immune to stray noise, while providing for reliable, rapid operation without delay. Spurious response due to noise pulses and waviness of power supply, as may occur in motor vehicle operation, is avoided. The system can readily be adjusted to the weight of the vehicle; as the weight of the vehicle, or the mass to be carried increases, a higher braking or tractive effort can be applied before the wheels will slip or skid. The operation of the system is independent of surface condition between wheel and roadway, being dependent only on wheel speed and rate of change of wheel speed. Since, at low speeds, overriding blocking of wheels is not important, the circuit does not respond at low speed at all.

Figure 7:
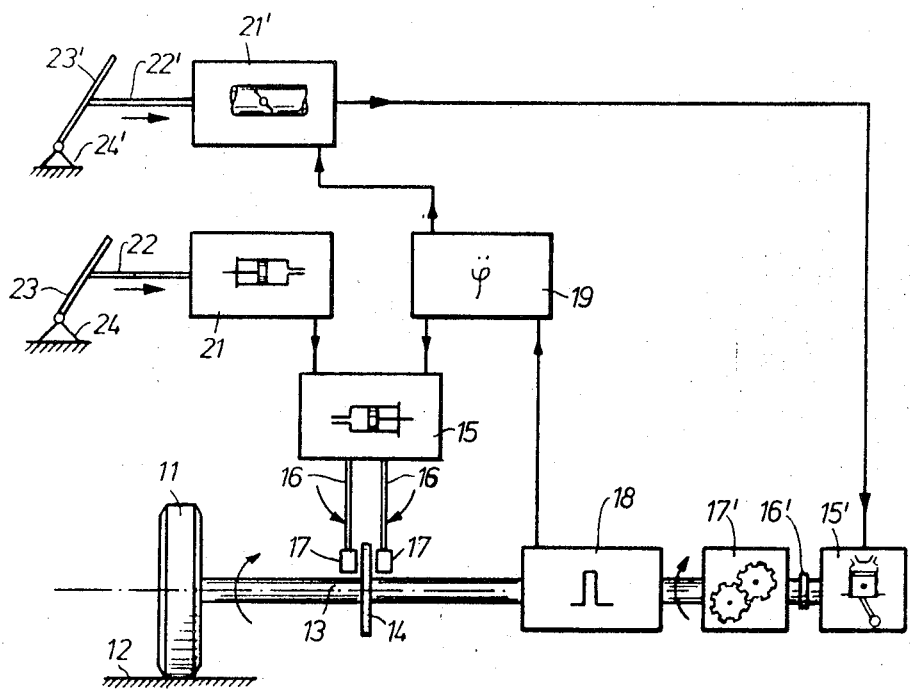
FIG. 7 is a schematic arrangement of the slip detection device to detect wheel slip both upon braking of wheels, as well as upon acceleration.

So far the present invention has been described in connection with detection of wheel slip upon braking, that is upon deceleration. The identical system will detect slip upon acceleration. FIG. 7 illustrates the system when applied to sense slip both upon acceleration as well as deceleration. Elements previously described have been given the same reference numerals and will not be described again.

An acceleration control pedal 23', secured, for example, to the vehicle frame at 24' controls over a linkage 22' a throttle 21'. The throttle control controls the admission of fuel to an engine 15' which drives over a coupling 16' a transmission 17'. The transmission in turn couples the shaft 13 connected to wheel 11. Transducer 18 will thus sense the speed of the wheel, both when decelerating as well as when being driven.

The control unit 19 sends a control signal not only to braking system 15 to override the braking effort controlled by brake pedal 23, but also to the throttle control 21', to override the control by the acceleration pedal 23'.

Figure 6:
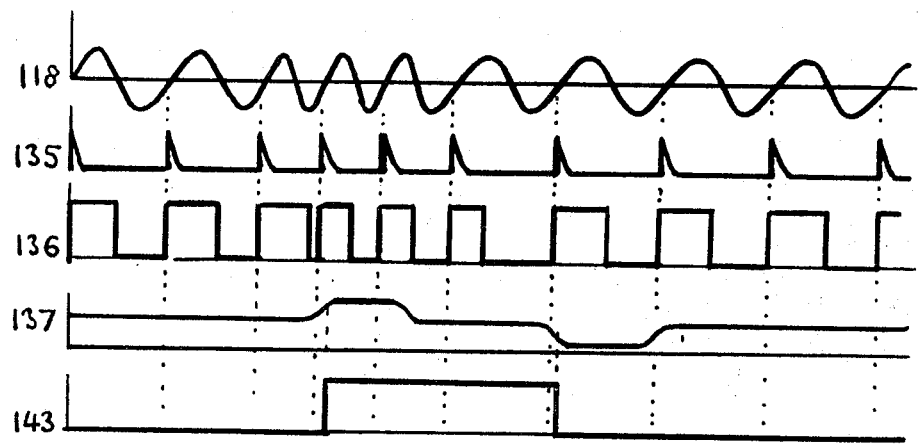
FIG. 6 is a series of timing diagrams, similar to FIG. 5, illustrating voltage relationships in the circuit of FIG. 7, upon acceleration.

FIG. 6 illustrates the pulse distribution, and the timing relationship upon sensing of increased acceleration, which might cause slip due to spinning of the wheels. The graphs are numbered similarly to the numbering of the graphs of FIG. 5. The pulse distribution of the pulses 136 is different, however; upon excessive acceleration, the pulses will occur more rapidly and the output from network 37 will rise to a level just above +b. The circuit 19, upon overriding the control from acceleration controller 23' will decrease the amount of fuel supplied until the wheel stops slipping and wheel speed will drop below the level −b—in other words the reverse of the operation previously described in connection with FIG. 5. The output from the hysteresis circuit 42 may, in certain connections, have reverse polarity upon sensing of excessive rate of acceleration. The input to circuit 43 may, therefore, have to be conducted over an additional circuit sensing absolute values and having output of uniform polarity. The circuit of the present invention can, therefore, control wheel slip with one single control circuit, regardless of whether the wheel slip is caused upon deceleration, or acceleration.

We claim:

1. Wheel slip detection device to detect transition from rolling to sliding of a wheel (11) over a surface (12) upon change of speed of the wheel comprising
   transducer means (18) coupled to the wheel and providing an output signal (118) having a characteristic representative of wheel speed;
   means (34, 35) connected to said transducer means and deriving a pulse sequence having a distance between pulses representative of wheel speed;
   circuit means (36, 38) including an integrating network, said circuit means being connected to have the pulses of said pulse sequence applied thereto and sensing change of elapsed time between said pulses;
   means (42, 43) sensing excess change in the rate of change of pulses beyond a predetermined limit;
   and means (47, 46) deriving an output signal from said sensing means,
   wherein said means deriving the pulse sequence includes a wave shaping network (34);
   and said circuit means includes an input monostable multivibrator (36) connected to said pulse shaping network and changing state upon occurrence of each pulse from said wave shaping network;
   and a low-pass filter (37) interconnecting the output of said monostable multivibrator (36) and said integrating network (38), the output of said integrating network being connected back to said monostable multivibrator to control the unstable time period thereof in accordance with the rate of pulses applied to said integrating network through said low-pass filter (37).

2. Device according to claim 1 wherein said means sensing excess change in the rate of change of pulses includes a hysteresis circuit (42) connected to the low-pass filter (37) to sense deviation of output voltage of the low-pass filter from a predetermined value.

3. Device according to claim 2 wherein the hysteresis circuit is an operational amplifier.

4. Device according to claim 2 wherein the hysteresis circuit is a Schmitt trigger.

5. Device according to claim 1 including means (48, 51, 52, 45) sensing low absolute speed of the wheel below a predetermined limit;
   said means deriving an output signal including a coincidence network (44) having an output from said sensing circuit (42, 43) applied to one input thereof and the output from said low absolute speed sensing means to another input thereof.

6. Device according to claim 5 sensing wheel slip for a plurality of wheels, each provided with a transducer, wherein said low absolute speed sensing means comprises an AND-gate (51) having one input each connected to a transducer (18) and delivering said signals having said characteristics representative of wheel speed.

7. Device according to claim 6 wherein said means sensing excess change of rate of pulses includes a hysteresis circuit (42) connected to the low-pass filter (37) and an output monostable multivibrator (43) having its input connected to said hysteresis circuit;
   the output of said monostable multivibrator (43) being connected to said AND gate (51) and to said means delivering an output signal, said AND gate (51) being enabled when the speed of the wheels is in excess of said predetermined limit.

8. Device according to claim 1 wherein said means deriving a pulse sequence comprises a Schmitt trigger circuit (34) and a differentiating network (35) connected to the output of said Schmitt trigger circuit.

9. Multiple wheel vehicle having a wheel slip detection device in accordance with claim 1, wherein each wheel, or group of wheels is associated with:
   a transducer means (18);
   means delivering a pulse sequence (34, 35);
   and circuit means sensing change of elapsed time between pulses (36, 38);
   means sensing excess change in the rate of change of pulses (42, 43);
   and means (47, 46) deriving an output signal from said sensing means;
   and wherein a common means (48, 48'); (51, 52); (45—45') is provided sensing absolute wheel speed of all said wheels and inhibiting generation of an output signal if the speed instantaneous absolute speed of the vehicle is below a predetermined limit.

10. Device according to claim 1 wherein said transducer means includes a magnetic transducer wheel mechanically coupled to said wheel, said transducer wheel having intermittently magnetic material located along its circumference;

and a yoke (28) cooperating with said intermittent magnetic material, and a coil (29) associated therewith, said coil having pulses induced therein upon rotation of said transducer wheel with respect to said yoke.

11. Device according to claim 10 wherein said transducer wheel comprises a plurality of magnets located at the circumference thereof, and of adjacent opposite polarity, and located in a magnetic circuit with said yoke.

12. Device according to claim 10 wherein said transducer wheel comprises a plurality of salient poles of ferromagnetic material and said coil is connected to a source of direct current.

13. Device according to claim 1 wherein said transducer means comprises a tachometer generator.

14. Device according to claim 1 wherein said transducer means includes an optical transducer having a source of light and the light-sensitive element, and a moveable reflector secured to rotate with said wheel (11) and reflecting light from said source to said photosensitive element, intermittently, upon rotation of said wheel.

15. Device according to claim 1 in combination with a vehicle braking system, said means (46) deriving an output signal being connected to the vehicle braking system and supplying a control signal thereto upon detection of change of elapsed time between pulses in excess of a predetermined value.

* * * * *